United States Patent Office 2,905,433
Patented Sept. 22, 1959

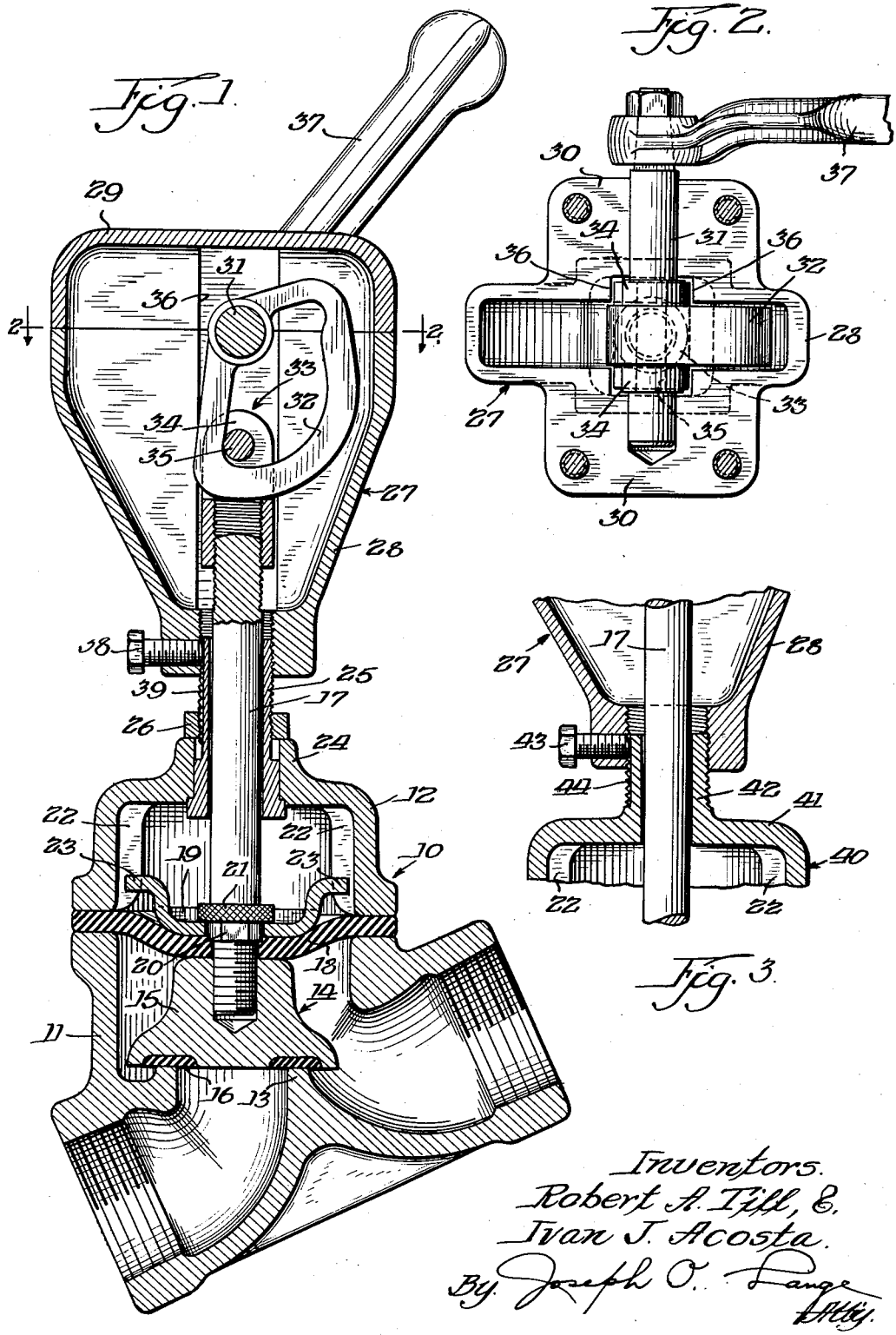

2,905,433

ADJUSTABLE VALVE ACTUATION MEANS

Robert A. Till and Ivan J. Acosta, Chicago, Ill., assignors to Crane Co., Chicago, Ill., a corporation of Illinois Application November 13, 1956, Serial No. 621,612

14 Claims. (Cl. 251—251)

The present invention relates broadly to valve actuation means or the like and is of the general type in which opening and closing is accomplished by rectilinear longitudinal reciprocation of a stem carrying closure means. More specifically, it is concerned with such valve actuating means in which precise adjustment of the closure means for tight closing thereof is provided.

In the illustrated embodiments, the invention is shown as incorporated in a cam-operated quick-opening diaphragm valve by way of example. Briefly, a housing serving to support a cam is threaded on a tubular extension of the valve casing through which the stem projects into the housing. The stem is held against rotation and is threadedly connected to a cam follower engaged with the cam so as to effect longitudinal movement of the stem and a closure carried thereby toward or from a seat in the valve casing upon actuation of the cam. The cam and follower are arranged to rotate with the housing when adjustment of the closure relative to the seat is desired. In such rotation, the housing is screwed toward or from the casing and seat so as to advance or retract the closure relative to the seat, and assuming that the threads of the follower connection to the stem are of the hand as the threads of the housing connection to the casing, the stem is moved by the follower connection in the direction opposite to that of the movement of the housing, cam and follower. The housing connection threads have a greater helix angle or lead than the follower connection threads, so that when the housing is moved toward the seat, the stem and closure are moved toward the seat a distance corresponding to the difference of the thread helix angles. A predetermined adjusting movement of the closure is thus effected by one turn of the housing. Of course, the invention is not limited to closure adjustment by 360° rotation of the housing when the rotational position of the housing relative to the casing is immaterial, and very precise adjustment may be obtained by turning the housing any desired amount. Similarly, if the threads of the respective connections are made of opposite hands, the distance through which the closure is moved by any rotation of the housing corresponds to the sum of the leads or helix angles of the threads, so that relatively great yet exact adjustment or take-up may be obtained by slight turning of the housing. The differential threading of the respective housing and follower connections, whether the difference is in the leads or the hands, thus may be utilized to obtain a perfect seating of the closure with whatever tightness is desired, and to compensate for looseness due to wear or other causes or for excessive tightness resulting from expansion or swelling. In one illustrated embodiment, the invention is shown as applied to existing valves, and in the other to valves initially formed for incorporation of the invention. Of course, other constructions employing the principle of the invention may be provided, whether operated by cam or other means.

It is an object of the invention to provide a valve construction by which precise adjustment of the valve closure relative to its seat may be made easily and expeditiously.

Another object is the provision of a valve employing differentially threaded means for adjusting the valve closure relative to its seat.

Another object is the provision of a valve in which adjusting movement of closure means relative to a valve seat is effected through differentially threaded means by rotation about the axis of a valve stem carrying the closure means.

A further object of the invention is the provision of a valve having means for effecting precise predetermined adjusting movement of the valve closure relative to the seat for a predetermined degree of bodily movement of the closure operating means axially of the seat.

Another object of the invention is to provide a valve in which precise predetermined adjusting movement of the valve closure relative to the seat is effected for a predetermined degree of bodily rotative movement of the closure operating means about the axis of the closure-carrying stem.

Other and further objects, advantages, and features of the invention will be apparent to those skilled in the art from the following detailed description and the accompanying drawings, in which Fig. 1 is a longitudinal sectional view of an existing valve adapted to incorporate the invention;

Fig. 2 is a horizontal sectional view taken approximately on the line 2—2 of Fig. 1, showing in plan the operating means and lower portion of the housing therefor; and Fig. 3 is a fragmentary sectional view similar to a portion of Fig. 1, showing a valve casing specifically formed for utilization of the invention.

Referring first to Figs. 1 and 2 of the drawings, there is shown a valve comprising a casing generally indicated at 10 which includes a body 11 and a bonnet 12 which may be bolted or otherwise suitably secured together. Within the body is a valve seat 13 defining a flow opening which may be closed by the valve closure 14. The closure may be of any suitable type, but is here shown as including a disk holder 15 carrying a sealing disk 16 for engagement with the seat 13. The disk holder is threadedly secured on the end of the valve stem 17 which projects from the bonnet. A flexible diaphragm 18 of rubber or similar material is secured between the body 11 and bonnet 12 and serves as a gasket sealing the joint therebetween, as well as sealing the bonnet against entry of fluid from the body. The diaphragm is clamped between the closure 14 and a plunger 19, both the diaphragm and plunger being apertured to receive the stem 17 therethrough. An enlargement 20 of non-circular shape is formed on the stem at the portion thereof extending through the plunger, and the aperture in the plunger is of corresponding shape so that the stem is held against any appreciable rotation relative to the plunger. A shoulder 21 is also formed on the stem adjacent the enlargement 20 to bear upon the plunger and clamp the plunger and diaphragm against the closure when the latter is secured on the stem.

The bonnet is formed with diametrically opposed outwardly offset wall portions defining guide channels 22 in which projecting guide lugs 23 of the plunger are engaged. The bonnet is provided with a hub 24 in which is engaged an outwardly projecting externally threaded yoke sleeve 25 forming in effect an extension of the casing. The yoke sleeve is secured by means of a flange at its inner end engaging the interior of the bonnet, and a lock nut 26 on its outer threaded portion engaging the hub 24. The stem 17 extends through the yoke sleeve in axial alignment with the seat 13 and is guided in non-rotative relation to the casing and seat by means of the engagement of the plunger lugs 23 in the channels 22 of the bonnet. The stem is arranged for longitudinal reciprocation toward and from the seat 13 by cam means hereinafter described, mounted in a housing 27 formed in two parts or portions. The lower portion of the housing has a threaded opening by which it is secured on the yoke sleeve and arranged for rotation thereon to be advanced or retracted relative to the valve seat 13. The upper housing portion 29 serves as a cap or cover therefor. The two portions of the housing are provided with laterally extending bolting flanges 30 by means of which they may be secured together, as by bolts or the like. The engaging surfaces of the housing portions are formed with semi-cylindrical recesses in opposite sides thereof which cooperate to provide apertures in which are journalled the opposite ends of a cam shaft 31 with which a cam 32 may be integrally formed, or to which the cam may be otherwise secured. This cam may be of any suitable form for the purpose, and is shown as having a curved bar-like portion with substantially parallel camming surfaces, extending generally arcuately and eccentric of the cam shaft 31. A cam follower in the form of a stem fork 33 is provided comprising an internally threaded sleeve portion from one end of which extend a pair of ears 34 between which the cam 32 is received, and carrying a cam roller pin 35 which engages the radially inner surface of the cam. The outer surface of the cam engages the end of the sleeve portion of the stem fork. The fork or cam follower is threadedly secured on the outer end of the stem 17, the threaded connection being in this case of the same hand as the connection of the housing on the yoke sleeve 25, but of smaller helix angle or lead. The side walls of the housing 27 are outwardly offset or otherwise formed to provide guide grooves 36 for the cam follower or stem fork and substantially prevent or definitely limit movement of the stem fork radially of the stem, and thus minimize the possibility of fatigue failure. The pin 35 is held in place by engagement of its ends with the bottoms of the grooves. Grease or other lubricant for the mechanism is contained in the housing. A handle 37 for turning the cam is secured in any suitable manner on an end of the cam shaft 31 projecting out of the housing 27. When the handle 37 is moved clockwise as viewed in Fig. 1, the cam 32 engages with the pin 35 to move the stem 17 upwardly and thus disengage the closure 14 from the seat, opening the valve. When the handle is moved in the opposite direction, to the position shown in Fig. 1, the cam surface engaging the upper end of the sleeve portion of the stem fork 33 moves the stem downwardly to force the closure into tight engagement with the valve seat. The housing 27 is normally held against rotation on the yoke sleeve by means of a set screw 38 engaging in a longitudinal slot 39 formed in the threads of the yoke sleeve.

In operation of the valve, compression of the disk 16 and wear of the parts may result in the disk seating rather loosely on the valve seat. Adjustment to the desired tightness may be accomplished by advancing the closure 14 relative to the seat. By the present invention, this is accomplished in a very precise manner by rotating the housing 27 on the yoke sleeve 25, about the axis of the stem 17, so that it is advanced toward the sleeve by reason of its threaded connection, the cam and stem fork advancing therewith. The set screw 38 is first retracted, and the valve preferably opened. The rotation of the housing of course also causes rotation of the cam 32 supported thereby, to effect rotation of the cam follower or stem fork 33 by reason of the engagement of the cam between the ears 34. Since the stem fork is threadedly connected to the stem and the stem is held against rotation, the fork is threaded further onto the stem while advancing with the housing, so that the stem is drawn relatively into the stem fork and away from the seat. By reason of the difference in helix angles or leads of the threaded connections of the housing on the yoke sleeve and the stem fork on the stem, however, the retraction of the closure 14 from the seat is less than its advance with the housing and stem fork toward the seat. The net movement of the stem and closure therefore is toward the seat by the distance corresponding to the difference in the threads. The difference in thread leads may be readily chosen so as to give a predeterminedly desired net movement of the closure for one turn or rotation of the housing on the yoke sleeve. Thus, if a compensatory adjustment of approximately .01 inch is desired for one turn of the housing, sixteen threads per inch may be used on the yoke sleeve and twenty threads per inch on the stem fork, the other factors of each thread, except of course the helix angle, being the same. The housing 27 will advance approximately .06 inch toward the seat 13 for each turn of the housing, of course carrying the stem fork and the stem with it, and at the same time the stem will move .05 inch away from the seat, so that the final adjusted position of the closure is substantially .01 inch closer to the seat than before the housing was turned. The adjustment of the closure relative to the seat may of course be in the retracting direction so as to give a looser engagement of the disk on the seat, as to compensate for swelling or other expansion of the closure, but ordinarily the adjustment is made to compensate for or take up wear which has caused looseness in seating.

Obviously any desired degree of adjustment of the closure may be achieved by turning the housing 27 more or less than a single turn, and the invention is not limited to the illustrated arrangement in which the housing is given a single full rotation each time adjustment of the disk is made, so that the housing and handle are always secured in the same rotated position relative to the valve casing by engagement of the set screw 38 in the slot 39. The arrangement shown, however, is advantageous in that the operating handle 37 is always maintained in the same plane relative to the casing, as for example, parallel to the plane of the flow passage through the valve, and thus does not require different movements of an operator's hand, or of linkage for operation thereof from a remote point, for different positions of the handle about the stem axis. When the valve is repeatedly opened and closed at relatively short intervals, this is of great advantage. It is to be noted, however, that the construction of Fig. 1 permits the handle to be disposed at any desired location about the rotational axis of the housing, regardless of the degree of housing rotation for closure adjustment. The yoke sleeve 25 is merely turned bodily with the housing, after backing off the lock nut 26, to locate the handle 27 in the desired position, and the nut then tightened.

In Fig. 3, there is illustrated a fragmentary detail of a valve substantially identical to that of Figs. 1 and 2, varying only in one respect. In this instance, the valve casing 40 includes a bonnet 41 which has an integral extension in the form of an externally threaded hub 42 in alignment with the valve seat and receiving the valve stem 17 therethrough in substantially the same manner as in the case of the yoke sleeve 25. The lower portion 28 of the cam housing 27 is mounted on the hub in the same manner as in the case of the yoke sleeve, being secured in a desired rotated position relative to the casing by a set screw 43 engaging in a longitudinal slot 44 formed in the threads of the hub. The construction of the casing and of the other portions of the valve may be substantially the same as shown in Fig. 1. The operation of the valve of Fig. 3 and adjustment of the closure relative to the valve seat is the same as in the case of the first-described construction. The construction shown is advantageous in providing a more integrated construction which simplifies assembly, decreases the height or length of the valve, and provides a stronger mounting for the housing.

It will be obvious that if desired, by making the lead of the threaded connection of the cam follower or stem fork 33 to the stem 17 greater than that of the housing portion 28 to the casing, adjusting movement of the closure toward the seat 13 may be accomplished by rotating the housing to retract it relative to the seat, or adjustment of the closure away from the seat may be effected by turning the housing to move toward the valve casing. Similarly, by making the respective connections of the stem fork and housing of opposite hand, relatively great adjusting movement of the closure may be attained by slight rotational movement of the housing. The differential threading of the two connections may thus be varied as desired in accordance with the particular circumstances of use and the specific end to be achieved.

The invention is particularly advantageous in connection with quick-opening valves subjected to hard usage and wear by repeated opening and closing thereof, but it will be apparent that the invention is not limited to such valves. Nor is the invention limited to application in cam-operated valves such as shown, or in valves with the particular type of closure illustrated.

The invention therefore is not to be limited to the specific embodiments thereof illustrated in the drawing, but only as required by the spirit and scope of the appended claims.

We claim:

1. A valve structure comprising a valve casing, a valve seat in said casing, a tubular threaded extension on the casing axially aligned with the seat, a longitudinally reciprocable valve stem projecting from the casing guided in said extension, a valve closure on the inner end of said stem movable thereby into and out of engagement with the seat, cam support means having threaded connection with the casing extension and rotatable thereon for adjustment toward and from the seat, cam means movably mounted on said support means and rotatable therewith, cam follower means having threaded connection on the outer end of the stem of the same hand as said support means connection but of smaller helix angle, said follower means engaging with said cam means for rotation therewith and movement thereby longitudinally of the stem, means for operating the cam means, means holding the stem against rotation to effect longitudinal adjusting movement thereof relative to the seat upon rotation of the support means, and guide means on the support means substantially preventing radial movement of the follower means connection.

2. A valve structure comprising a valve casing, a valve seat in said casing, a tubular threaded extension of the casing axially aligned with said seat, cam support means having threaded connection with said extension and rotatable thereon for adjustment toward and from the seat, cam means mounted for camming movement on said support means and rotatable therewith, a valve stem axially aligned with the seat projecting from the casing through said extension for longitudinal reciprocation, a valve closure on the inner end of said stem movable thereby into and out of engagement with the seat, cam follower means engaging said cam means for movement thereby longitudinally of the stem and for rotation with the support means, said follower means having threaded connection on the outer end of the stem of the same hand as said connection of the support means and casing and of smaller helix angle, means for holding the stem against rotation to effect longitudinal adjustment thereof relative to the seat upon rotation of the support means, and means for operating the cam means.

3. A valve comprising a valve casing, a valve seat in said casing, support means having a threaded connection to the casing about the axis of said seat and rotatable for threaded adjustment toward and from the seat, a valve stem longitudinally movable toward and from the seat projecting from the casing through said support means connection, a valve closure on the inner end of said stem movable thereby into and out of engagement with the seat, stem operating means having a threaded connection to the outer end of the stem of the same hand as the support means connection and of different helix angle, said operating means being mounted on the support means for rotation therewith and for movement effecting longitudinal movement of the stem, and means holding the stem against rotation to effect longitudinal adjusting movement thereof relative to said operating means connection upon rotation of said support means.

4. A valve comprising a valve casing, valve seat means in said casing, support means having a threaded connection to the casing about the axis of said seat means and rotatable for threaded adjustment toward and from the seat means, a valve stem longitudinally movable toward and from the seat means projecting from the casing through said support means connection, valve closure means on the inner end of said stem movable thereby into and out of engagement with the seat means, stem operating means having a threaded connection to the outer end of the stem mounted on the support means for rotation therewith and for independent movement effecting longitudinal movement of the stem, the respective support means and operating means connections being differentially threaded, and means holding the stem against rotation for longitudinal adjustment thereof relative to said operating means connection by rotation of the support means.

5. A valve structure comprising a valve casing, a valve seat in said casing, an aperture in the casing, a threaded yoke sleeve releasably secured projecting outwardly through said aperture in axial alignment with said seat, cam support means threadedly connected to said sleeve and rotatable thereon for adjustment toward and from the seat, cam means mounted on said support means for camming movement thereon and rotation therewith, a valve stem longitudinally movable toward and from the seat projecting from the casing through the sleeve, a valve closure on the inner end of said stem movable thereby into and out of engagement with the seat, cam follower means engaging said cam means for movement thereby longitudinally of the stem and for rotation with the support means, said follower means having a threaded connection to the outer end of the stem of the same hand as said support means connection to the sleeve and of smaller helix angle, means holding the stem against rotation to effect longitudinal adjustment thereof relative to the seat upon rotation of the support means, guide means on the support means substantially preventing radial movement of the follower means connection, and means for operating the cam means.

6. A valve comprising a valve casing, valve seat means in said casing, an aperture in the casing, a threaded yoke sleeve secured projecting outwardly through said aperture about the axis of said seat means, cam support means having a threaded connection to the sleeve and rotatable thereon for adjustment toward and from the seat means, cam means mounted on said support means for camming movement thereon and rotation therewith, a valve stem longitudinally movable toward and from the seat means projecting from within the casing through the sleeve, valve closure means on the inner end of said stem movable thereby into and out of engagement with the seat means, cam follower means engaging said cam means for movement thereby longitudinally of the stem and for rotation with the support means, said follower means having a threaded connection to the outer end of the stem of the same hand as said support means and of different helix angle, means holding the stem against rotation for longitudinal adjustment thereof relative to the seat means upon rotation of the support means, and means for operating the cam means.

7. A valve comprising a valve casing, valve seat means in said casing, an aperture in the casing, a threaded yoke sleeve secured projecting outwardly through said aperture about the axis of said seat means, support means having a threaded connection to the sleeve and rotatable thereon for adjustment toward and from the seat means, a valve stem longitudinally movable toward and from the seat means projecting from within the casing through the sleeve, valve closure means on the inner end of said stem movable thereby into and out of engagement with the seat means, stem operating means having a threaded connection to the outer end of the stem mounted on the support means for rotation therewith and for independent movement thereon effecting longitudinal movement of the stem, the respective support means and operating means connections being differentially threaded, and means holding the stem against rotation for longitudinal adjustment thereof relative to the seat means by rotation of the support means.

8. A valve structure comprising a valve casing, a valve seat in said casing, a threaded apertured outwardly projecting extension of the casing axially in alignment with said seat, cam support means having threaded connection to said extension and rotatable thereon for adjustment toward and from the seat, cam means mounted on said support means for camming movement thereon and rotation therewith, a valve stem longitudinally reciprocable toward and from the seat projecting from within the casing through said extension, a valve closure on the inner end of said stem movable thereby into and out of engagement with the seat, cam follower means engaging said cam means for movement thereby longitudinally of the stem and for rotation with the support means, said follower means having a threaded connection to the outer end of the stem of the same hand as said support means connection and of smaller helix angle, means holding the stem against rotation for effecting longitudinal adjustment thereof relative to the seat by rotation of the support means, guide means preventing radial movement of the follower means connection, and means for operating the cam means.

9. A valve comprising a valve casing, valve seat means in said casing, a threaded hub on the casing apertured in alignment with said seat means, cam support means having a threaded connection to said hub and rotatable thereon for adjustment toward and from the seat, cam means mounted for camming movement on the support means and rotatable therewith, a valve stem longitudinally reciprocable toward and from the seat means projecting from within the casing through the hub, valve closure means on the inner end of said stem movable thereby into and out of engagement with the seat means, cam follower means engaging said cam means for movement thereby longitudinally of the stem and for rotation with the support means, said follower means having a threaded connection to the outer end of the stem of the same hand as said support means connection and of different helix angle, means holding the stem against rotation for longitudinal adjustment thereof relative to the seat means by rotation of the support means, and means for operating the cam means.

10. A valve comprising a valve casing, valve seat means in said casing, a threaded hub on the casing apertured in alignment with said seat means, support means having a threaded connection to said hub and rotatable thereon for adjustment toward and from the seat means, a valve stem longitudinally reciprocable toward and from the seat means projecting from within the casing through the hub, valve closure means on the inner end of said stem movable thereby into and out of engagement with the seat means, stem operating means having a threaded connection to the outer portion of the stem mounted on the support means for rotation therewith and for movement thereon effecting longitudinal movement of the stem, the respective support means and operating means connections being differentially threaded, and means holding the stem against rotation for longitudinal adjustment thereof relative to the seat means by rotation of the support means.

11. Adjusting means for a valve stem longitudinally reciprocable through a valve casing, comprising a tubular threaded extension on the casing receiving the valve stem therethrough, means holding said stem against rotation, support means having threaded connection with the casing extension and rotatable thereon for adjustment toward and from the casing, means for reciprocating the stem mounted on said support means and rotatable therewith, and means operatively connecting the stem and reciprocating means arranged rotatable with the reciprocating means and having threaded connection with the outer end of the stem of the same hand as said support means connection but of smaller helix angle.

12. Adjusting means for a valve stem longitudinally reciprocable through a valve casing, comprising a tubular threaded extension on the casing receiving the valve stem therethrough, means holding said stem against rotation, support means having threaded connection with said extension and rotatable thereon for adjustment toward and from the casing, means for reciprocating the stem mounted on said support means and rotatable therewith, and means operatively connecting the stem and reciprocating means rotatable with the reciprocating means and support means and having threaded connection with the outer end of the stem, said connections being differentially threaded.

13. Adjusting means for a valve stem longitudinally reciprocable through a valve casing, comprising support means having threaded connection to the casing about the axis of said stem, means holding the stem against rotation, reciprocating means for reciprocating the stem mounted on said support means and rotatable therewith, connecting means operatively connecting the stem and reciprocating means and being rotatable with the reciprocating means and support means, the connecting means having a threaded connection with the outer end of the stem of different helix angle than the connection of the support means and casing.

14. Adjusting means for a valve stem longitudinally reciprocable through a valve casing, comprising support means having threaded connection to the casing about the axis of said stem, means holding the stem against rotation, reciprocating means for reciprocating the stem mounted on said support means and rotatable therewith, and connecting means operatively connecting the stem and reciprocating means and being rotatable with the reciprocating means and support means, the connecting means having a threaded connection with the outer end of the stem, said connections being differentially threaded.

References Cited in the file of this patent
UNITED STATES PATENTS

| | | |
|---|---|---|
| 1,055,152 | Erickson | Mar. 4, 1913 |
| 2,066,112 | Humblet | Dec. 29, 1936 |